Feb. 17, 1970　　　　　　　　L. KULL　　　　　　　3,496,438
TIME CONTROLLED PROGRAMMER FOR A TUNER INCLUDING A DIGITAL
Filed July 14, 1965　　　　　SERVOMOTOR CONTROL
　　　　　　　　　　　　　　　　　　　　　　7 Sheets-Sheet 1

INVENTOR.
Leo Kull

INVENTOR.
Leo Kull

INVENTOR.
Leo Kull

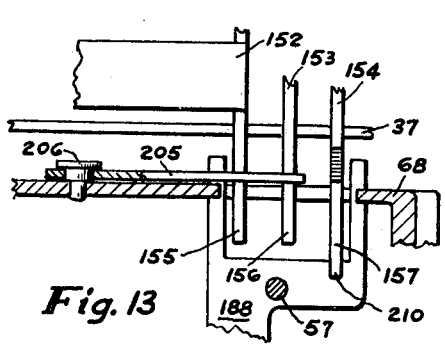
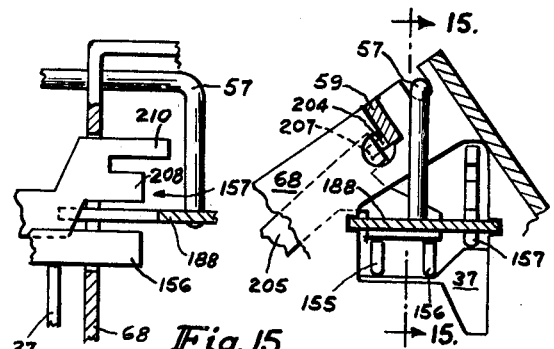
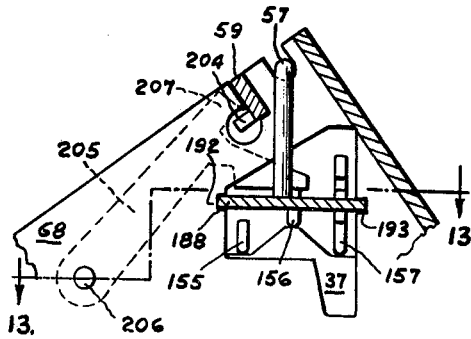
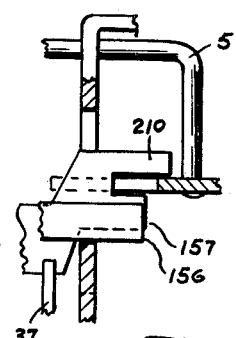
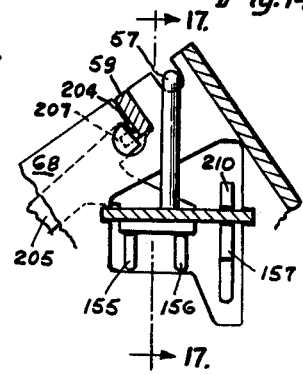
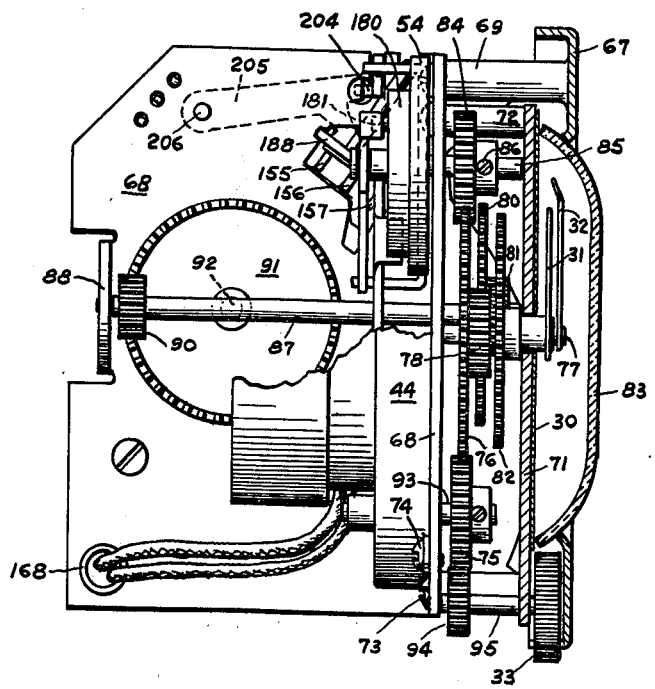
Fig. 13  Fig. 15  Fig. 14
Fig. 12  Fig. 17  Fig. 16
Fig. 11
INVENTOR.
Leo Kull Feb. 17, 1970   L. KULL   3,496,438
TIME CONTROLLED PROGRAMMER FOR A TUNER INCLUDING A DIGITAL
SERVOMOTOR CONTROL
Filed July 14, 1965   7 Sheets-Sheet 6
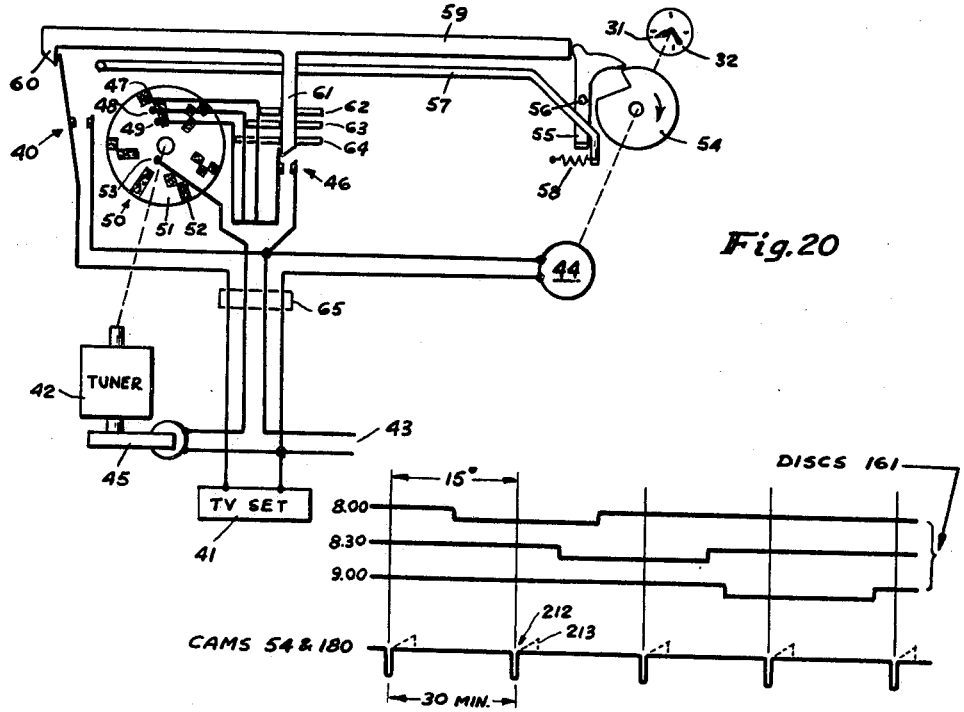
Fig. 20
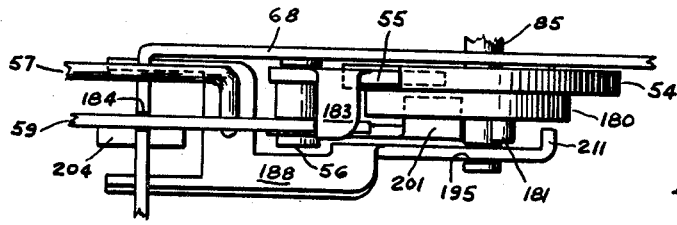
Fig. 21
Fig. 19
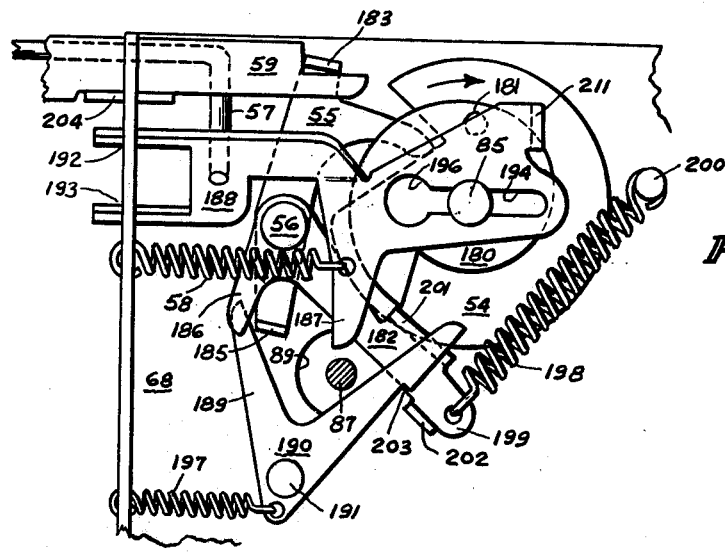
Fig. 18
INVENTOR.
Leo Kull

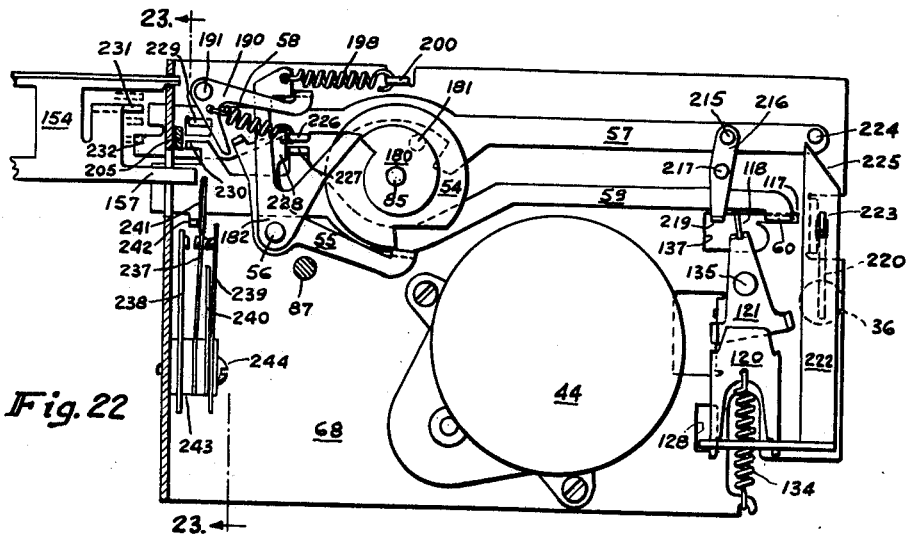
Fig. 22
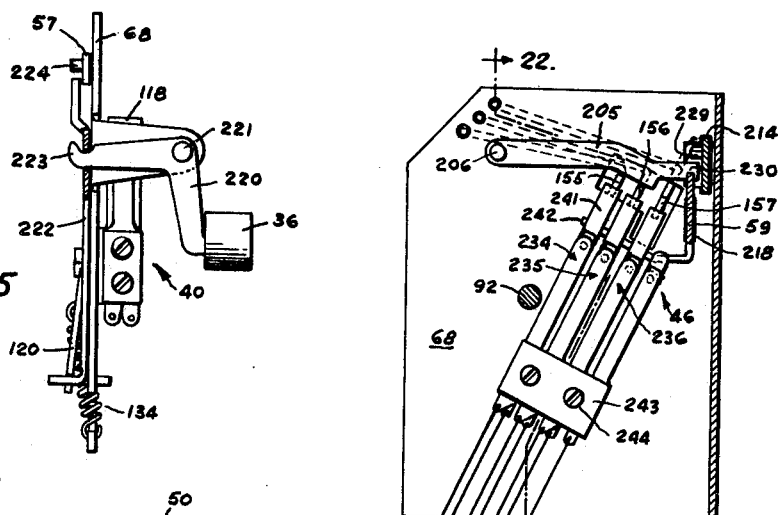
Fig. 25
Fig. 23
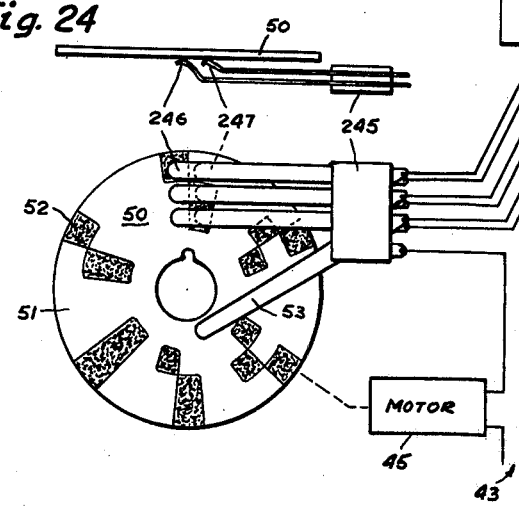
Fig. 24
INVENTOR.
Leo Kull

United States Patent Office 3,496,438
Patented Feb. 17, 1970

3,496,438
TIME CONTROLLED PROGRAMMER FOR A TUNER INCLUDING A DIGITAL SERVO-MOTOR CONTROL
Leo Kull, 2 Washburn Place, Caldwell, N.J. 07006
Filed July 14, 1965, Ser. No. 471,988
Int. Cl. H02n 11/00
U.S. Cl. 318—33                             4 Claims

ABSTRACT OF THE DISCLOSURE

A time controlled programmer having selector keys for making multiple preselections for a shaft positioning device and for an ON-OFF control; timing means for activating the preselections one after another to perform an encoding action to a number of code bars; a code combination serving to actuate a binary disc or commutator which acts as a decoder and which passes the control circuit of a motor which drives it; a mating between code patterns being used to break the motor circuit and stop the commutator at a preselected position.

---

This invention relates to automatic position seeking devices initiated and controlled by a preselected program. One of the common applications for a positioning control is automatic station changing of radio and television receivers according to a timed preselected program schedule.

The devices of this kind are intended for operation by home personnel and therefore great importance is given to certain requirements which have to be met to serve the purpose best.

It is an object of this invention to provide in a device of the type specified a coded position seeking mechanism adapted to receive its orders from a series of code bars.

It is another object of the invention to provide this coded position seeking control in a greatly simplified and compact form without the use of a costly and complex relay network and with the flexibility of arranging the code control shaft positions in any non-equidistant manner on a single commutator.

It is a further object to provide a simple selection key to set up the code bars and means to automatically drive the selector keys back to their "home" position after they have performed their function.

It is yet another object to provide an ON-OFF control which can be operated simultaneously automatically or manually without the use of any other controls.

It is a still further object to provide a pushbutton control to an ON-OFF switch with the provision that the same switch can be also operated automatically.

It is another object to provide a one-time OFF function after all the selector keys have returned to their "home" position.

It is a further object to provide an electrical connection between the control mechanism and the position seeking mechanism.

The foregoing and other objects of the invention not enumerated are achieved with a simple visible program face where the only control is a selector key for each available time point and as a further feature, a simultaneous automatic or manual selection is made possible at any time without need for a manual-to-automatic switchover or any other similar control required to make one or the other operation possible.

The invention will become apparent from the following description considered in connection with the accompanying drawings in which:

FIG. 11 is a sectional view of FIG. 3, taken along the line 11—11;

FIG. 12 is an enlarged view of some of the parts as they appear in FIG. 11 but shown under a different angle;

FIG. 13 is a fragmentary top view of FIG. 12, taken along the line 13—13 thereof;

FIGS. 14 and 16 are fragmentary views similar to FIG. 12 but some of the parts shown in a different operating position;

Figure 3:
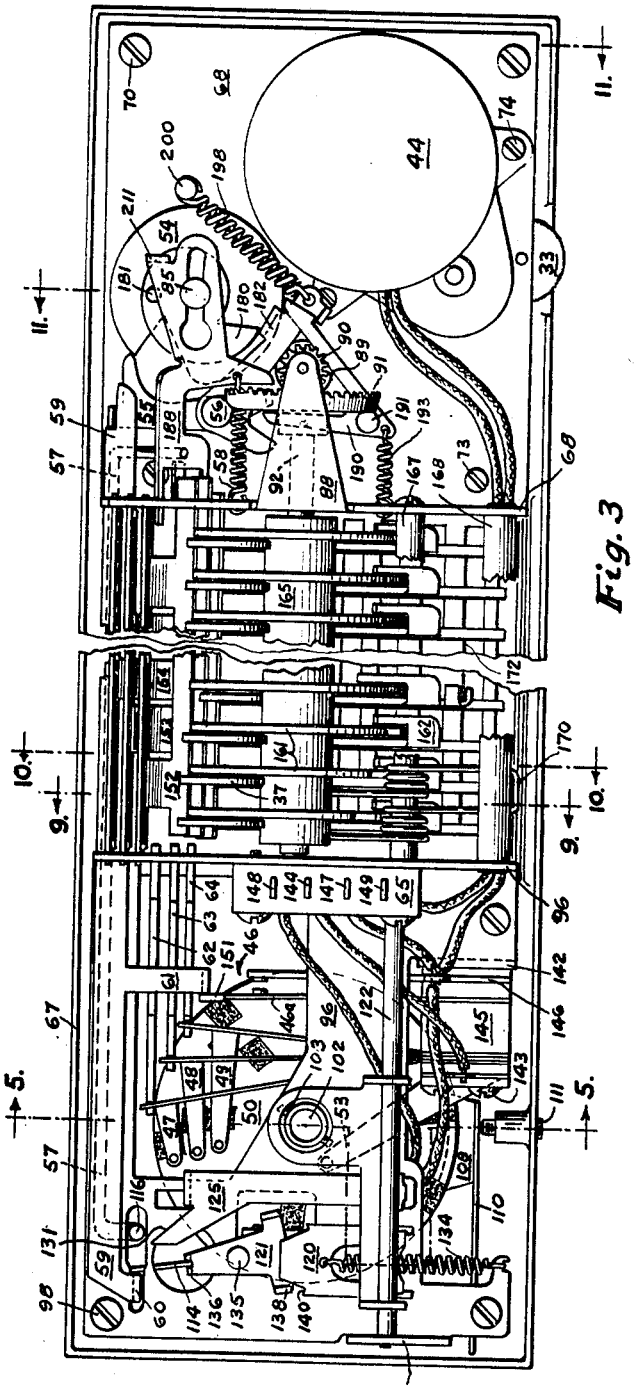
FIG. 3 is a rear elevational view of the programming device, showing all the operational parts, the center section being shortened.
Figure 7:
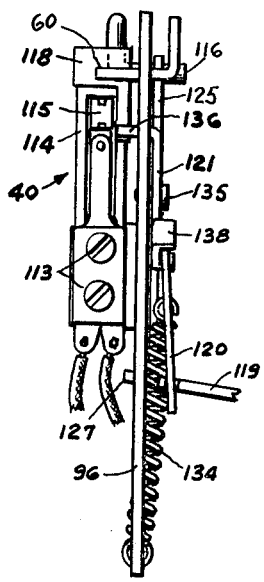
FIG. 7 is a side view of FIG. 6.

FIGS. 15 and 17 are fragmentary sectional views of FIGS. 14 and 16, taken along the lines 15—15 and 17—17, respectively;

FIG. 18 is an enlarged fragmentary view of timing cams with the mechanism in a different position from that shown in FIG. 3;

FIG. 19 is a top view of the mechanism in FIG. 18;

FIG. 20 is a schematic diagram of the control circuitry of the invention;

FIG. 21 is a diagram showing the timing cycles of the mechanism;

FIG. 22 is a sectional elevational view of a modified control mechanism, taken along the line 22—22 of FIG. 23;

FIG. 23 is a combination of a sectional side view, taken along the line 23—23 of FIG. 22 and a diagrammatic view of the position seeking disc with its control circuitry;

FIG. 24 is a detailed top view of the position seeking disc with its wiping contacts, and FIG. 25 is a detailed side view of the manual switch control mechanism.

Figure 1:
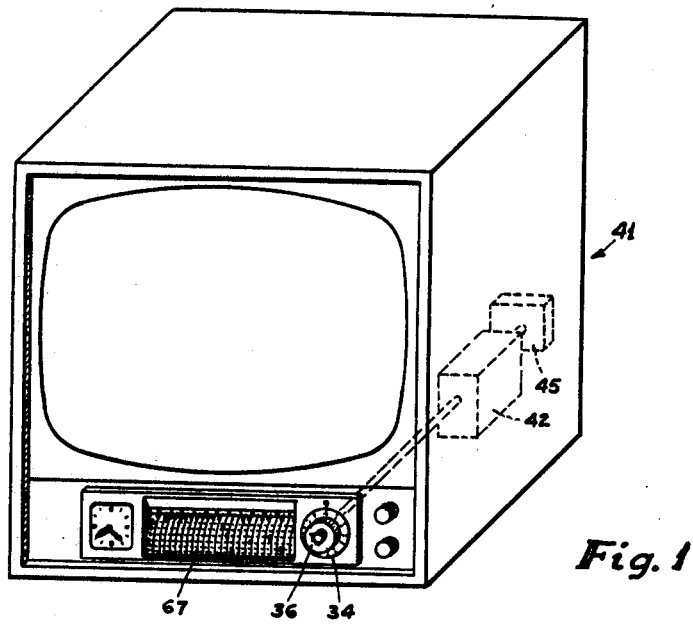
FIG. 1 is a perspective view of a conventional television set to which a programming device embodying my invention is operatively applied.
Figure 2:
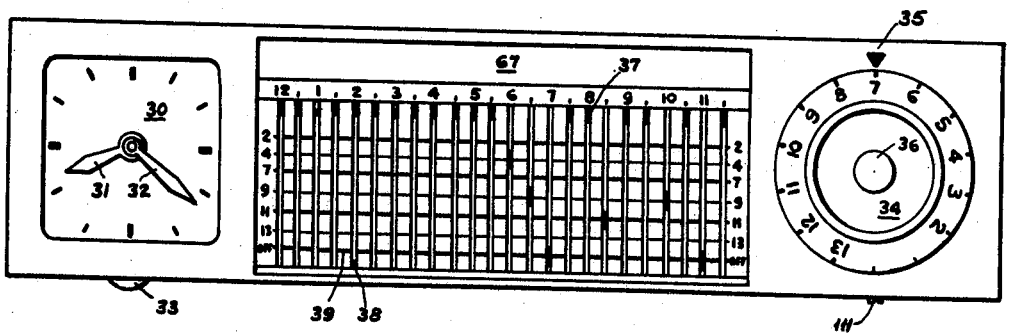
FIG. 2 is a front elevational view on an enlarged scale, of the programming face and controls shown in FIG. 1.
Figure 4:
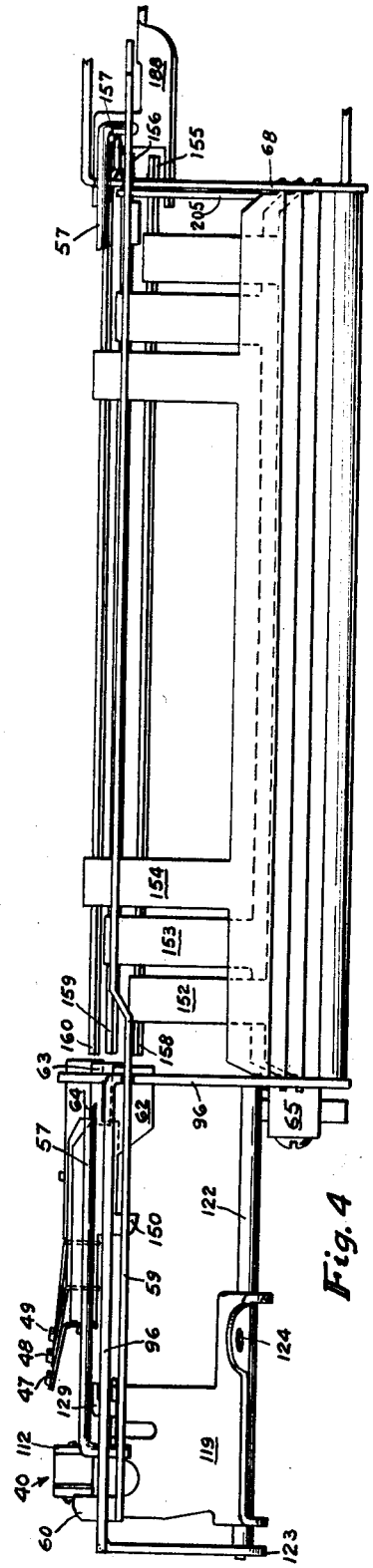
FIG. 4 is a partial top view of FIG. 3 showing some of the operational parts.

Before describing the mechanism in detail, reference is made to FIGS. 1 and 2 which show the face of the programmer together with all the controls for the operator. The panel or base 67 of the programmer shows a clockface 30 with an hour hand 31 and a minute hand 32, serving the purpose as ordinary time telling means. A knurled thumbwheel 33 is used for setting the clockhands when the programmer is first put in use or at any other time an adjustment of time of day is required.

The right side of the panel has a channel selector knob 34 with appropriate indicia printed on its flange and an indicating pointer 35 applied to the panel. The ON-OFF switch 40 is controlled by a pushbutton 36, located in the center of knob 34.

The center section of the panel contains means for setting up the program and providing a simple visible record of the selected program. In the present embodiment it is considered that a program change every 30 minutes and a 12-hour time scale is sufficient and consequently 24 pre-selectable time points are available. Each time point has a selector lever 37 extending out through vertical slots 38 which are indicated with a time point: full hours being marked 1–12 and the half hour points with a dot. Six available channels and an OFF position have horizontal positioning lines 39 and the station identification numbers appear at the ends of each line. For better readability the lines 39 can be made alternately heavy and light or in different colors.

To set up a program the operator selects a time point and moves the lever 37 down until its location stays on the intersection of the desired channel. Up to 23 pre-selections can be made this way with a maximum of eleven and a half hours ahead. It is not necessary to repeat the selection if a selected program is scheduled to stay on more than 30 minutes. In FIG. 2 the program can be read as follows: 6:00 o'clock—channel 4, 6:30 o'clock—channel 7, 7:00 o'clock—off, 8:30 o'clock—channel 11, 10:00 o'clock—channel 9 and 11:00 o'clock—off. No other switches or controls are necessary to make the selected program automatically operable, and the channel knob 34 and ON-OFF pushbutton 36 can be used any time to make a manual selection.

Each automatic channel change will turn also the television set ON if it is not ON. The selector levers 37 are automatically returnable to their "home" position at the top of their respective slots 38 and when all of them are returned, the OF switching will be once performed half an hour after the last selection. This prevents an unattended television set to stay ON accidentally if the operator forgot to make the OFF selection at the end of his planned program.

FIG. 20 illustrates the basic functioning of the system, one object of which is to control the operation of a bi-stable switch 40 which is used to turn the television set ON and OFF, while the other object of which is to control the rotation of a rotary tuner unit 42, used for station selection. The system can be powered by an AC power source 43 which has a permanent connection to a timing clock motor 44. The switch 40 controls the television set 41 and a multicontact circuitry controls the tuner motor 45 which includes a contact-pair 46, a wiper group 47, 48 and 49, a disc 50, having conducting areas 51 and non-conducting areas 52 and a simple wiper 53 which completes the circuit. Both the switch 40 and tuner contacts 47–53 have their automatic control initiated by the clockmotor 44 which drives a timing cam 54 with a speed of 2 r.p.m. and the clockhands 31 and 32 in the conventional manner. A cam follower 55, pivoted at 56 acts as a reversing lever and permits the movement of a rod 57, powered by a spring 58, to the left and a movement of a shift-bar 59 to the right. The only function of rod 57 is to turn the switch 40 OFF while the bar 59 performs a triple function, namely, its arm 60 is used to turn switch 40 ON and another arm 61 lets the contact pair 46 to close and permits the movement of sensing plates 62, 63 and 64 together with their wipers 47, 48 and 49 to the right.

From the foregoing it can be seen that an alternating blocking to rod 57 or bar 59 permits the ON or OFF function to be performed while the blocking of both of them will prevent any action. A selective blocking to plates 62, 63 and 64 and an unblocked movement of bar 59 leads to closing the circuit to motor 45 with wipers 47, 48 and 49 taking a certain pattern which in turn will determine the position on which the disc 50 is stopped. The program mechanism thus has to provide various blocking combinations which are the function of manual pre-selection and time movement.

The circuitry in FIG. 20 can be broken in two sections by means of a 4-pin connector 65; the lower half being the conventional tuner 42 in a television set 41 (FIG. 1) and the drive motor 45, while the upper half is the control circuitry contained in the program mechanism which will be described in full detail hereafter.

The program mechanism, FIG. 3, is supported by a base 67 which may be the front panel of the programmer and which can be molded from a plastic material or may be a metal die casting and provides a support for the control mechanism on the left, the time drive on the right and the center part which has 24 vertical slots 38 to guide the selector levers 37.

The time mechanism, FIGS. 3 and 11, is supported by an L-shaped sheet metal bracket 68 which is secured to a series of posts 69 of base 67 by means of screws 70. A clockplate 71 is held in parallel relationship to plate 68 by means of a series of posts 72 and screws 73. The clockmotor 44 is mounted to plate 68 by means of two screws 74 and drives a pinion 75 with a speed of 2 r.p.h. The pinion 75 is in mesh with a gear 76 fast on a shaft 77 which drives the minute hand 32. To gear 76 is secured a pinion 78 which drives a reduction gear wheel 80 which in turn has a pinion 81 secured to it which secures the speed of $\frac{1}{12}$ r.p.h. to the hour wheel 82 and its hand 31. Both clock hands are rotatable over the clockface 30, held against plate 71 by means of a crystal 83 and the latter fitting into a rectangular opening in base 67.

The gear 76 is also in mesh with a pinion 84 on a shaft 85 and drives them with a speed of 2 r.p.h. Shaft 85 in turn is secured to a cam assembly 54 (FIGS. 3, 11, 18 and 20) which can be a nylon molding and in a preferred form is molded integrally with shaft 85. The pinion 84 is fastened to shaft 85 by means of a setscrew 86, permitting the assembly and setting of cam 54 thereby. Gear 80 has a long shaft 87 journaled between plate 71 and a bentover ear 88 of bracket 68. Shaft 87 extends through a hole 89 in bracket 68, large enough to clear a pinion 90 which is secured to shaft 87. Shaft 87 is in mesh with a crown gear 91, secured to the end of a shaft 92 and which will be driven with a speed of $\frac{1}{12}$ r.p.h.

The clockmotor 44 in the present case has a built in, one-way clutch making it possible to turn its output shaft 93 in the direction of its normal drive. A pinion 94 connected to the knurled thumbwheel 33 by means of a shaft 95 is used for the manual setting of the clockhands as well as cam 54 and shaft 92, all in their proper relationship.

Figure 5:
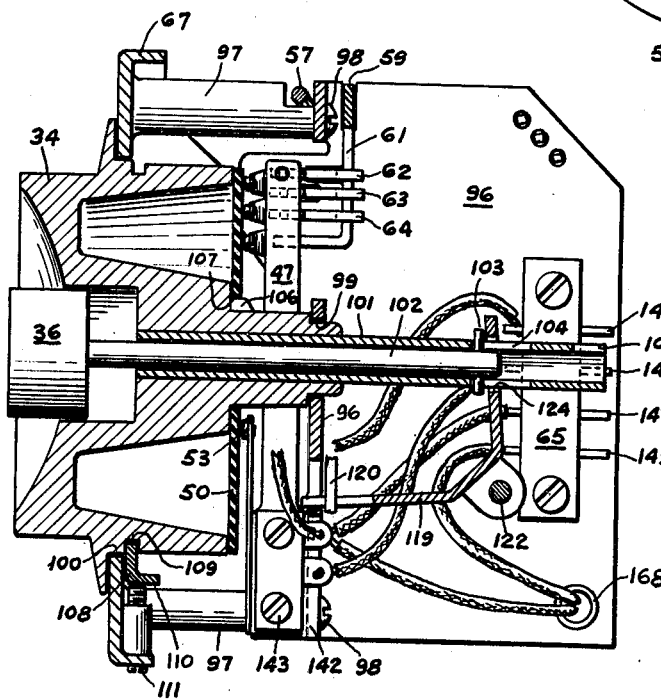
FIG. 5 is a sectional view of FIG. 3, taken along the broken line 5—5.
Figure 9:
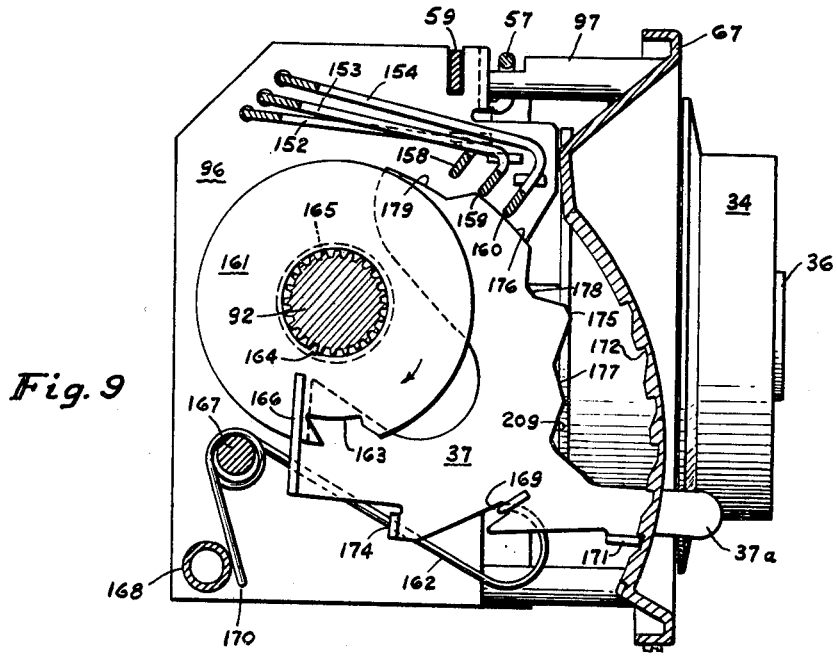
FIG. 9 is a sectional view of FIG. 3 taken along the line 9—9.

The other end of shaft 92 is journaled in another L-shaped bracket 96 which is also secured to a series of posts 97 of base 67 by means of screws 98, FIGS. 3, 5 and 9. Bracket 96 also provides support to the ON-OFF switch 40 with its control mechanism and the control circuitry of the tuner motor 45. A hole 99 in bracket 96 and another large hole 100 in base 67 rotatably support the channel selector knob 34 which may be a plastic molding having a metal tubular shaft 101 as an integral part of said knob. The ON-OFF pushbutton 36 is secured to a pushrod 102 which can move freely in tube 101 but the movement of it is restricted by a pin 103 working in a slot 104. Another slot 105 can serve as a coupling means to a pin (not shown) on the drive shaft of tuner 42. The knob 34 also serves to rotate the disc 50 on which it is held snugly and oriented by means of a key 106 and a keyway 107 in disc 50. The complete disc and knob assembly is held in place by means of a resilient retainer 108 which engages in a groove 109 (FIGS. 3 and 5). Retainer 108 has a bentover portion 110, one end of which is secured to the base 67 and its spring tension operates downwardly against a screw 111. Consequently, if the screw 111 is screw out, retainer 108 will follow it unitil it is out of the groove 109. This makes possible easy removal of the complete knob assembly from the front panel 68, for the purpose which will become apparent later.

Switch 40 is a conventional bi-stable circuit-breaker which can maintain either of its two positions. It is mounted to an ear 112, bent from the stock of bracket 96, by means of two screws 113 and it is operated by a leaf 114 in a well known manner using overcenter spring 115.

Means are provided to operate switch 40 manually from pushbutton 36 or automatically by the bar 59 or by the rod 57 (FIGS. 3, 4, 6 and 7). The bar 59 and rod 57 are movable in opposite directions, their operating adjacent ends 60 and 116 being guided in a slot 117 and adapted to operate upon opposite sides of an insulating end 118 of leaf 114. For manual operation a bellcrank 119, a pushplate 120 and a lever 121 are used. Bellcrank 119 is bent from sheet metal and is pivoted on a rod 122, the latter being secured between the bracket 96 and a bentover portion 123 of bracket 96. One arm of the bellcrank 119 has an aperture 124 to surround shaft 101 and is operable by pin 103 of pushrod 102. The other arm of bellcrank 119 operates the pushplate 120 and a camplate 125. The later has a rectangular hole 126 in it, through which extends an arm 127 of bellcrank 119. Arm 127 also extends through another rectangular opening 128 in bracket 96 which serves to limit the movement of the bellcrank 119 and to position it axially on rod 122.

Camplate 125 has a bentover end 129, which is guided in another rectangular hole 130 in the bracket 96, and a cam-surface 131 to push the end 116 of rod 57 to the right every time pushbutton 36 is pushed.

Pushplate 120 has a bifurcated stepped end 132 and 133 loosely fitting into slots of bellcrank 119, but held against it by means of a spring 134. The lever 121 is pivoted at 35 and has a bifurcated bentover end 136 which extends through a hole 137 in bracket 96 and operates the insulated end 118 of leaf 114. Lever 121 also has two bentover ears 138 and 139 which can be engaged with shoulders 140 and 141 of plate 120. It can be seen that the parts form a symmetrical arrangement where switch 40, pivot-point 135 and the anchoring points of spring 134 are on the same centerline. Spring 134 performs a triple function, namely, serves as a centering spring for plate 120, keeps the end of plate 120 against lever 121 and acts also as a return spring to bellcrank 119 as well as its pushbotton 36. While the pushplate 120 tends to center itself, the lever 121 will seek an overcenter position because of the spring 115 of switch 40.

Figure 6:
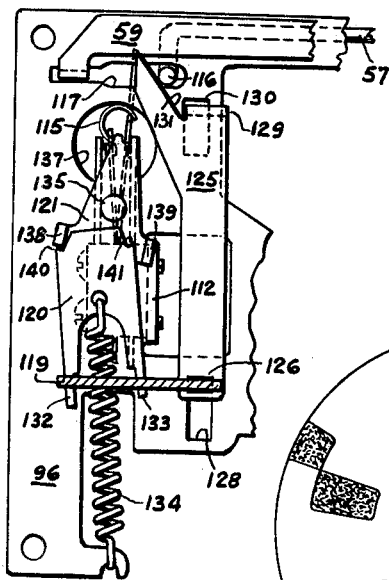
FIG. 6 is a fragmentary detail view of the switching mechanism.

A manual switchover from OFF to ON position in FIG. 3 is performed when the pushbutton 36 is pressed in. The step 140 and ear 138 will engage then and lever 121 together with switchblade 114 will be turned clockwise until the position in FIG. 6 is obtained; step 141 and ear 139 can pass freely each other. If now the pushbutton 36 is released, spring 134 returns the parts leaving the switch in an ON position, centering the pushplate 120 and setting the mechanism up for the next actuation in the opposite direction. It can be seen that lever 121 is normally free to move (FIG. 3) when leaf 114 is moved automatically, and no matter in which position it happens to be, the next manual operation will always move it over to the opposite position.

Bracket 96 also supports the contact assembly and wiper group 47–49 which is mounted to a bentover portion 142 of bracket 96 by means of two screws 143 which have insulating sleeves around them in a conventional manner. The assembly contains part of the circuitry in which wiping blade 53 is insulated from the rest and connected to point 144 of connector 65 and blades 47, 48 and 49 and the moving blade 46a of contact pair 46 are shorted by means of a conducting spacer block 145 but insulated from the rest. A stationary blade 146 is also insulated from the rest and has a junction point terminal which is connected to point 147 of connector 65. Point 148 is connected to switch 40 while point 149 is reserved for the motor 44.

The contact tips on wipers 47, 48 and 49 have a spring tension against disc 50 and their respective blades have a spring force to the right (FIG. 3). This however is restricted by sensing plates 62, 63 and 64 one end of each of them being guided by rectangular holes in bracket 96 (FIG. 5) while the other stepped down ends of them extend through holes in wiper blades 47, 48 and 49. The sensing plates 62, 63 and 64 have different lengths to provide operating clearance for their respective contact blades and their sensing ends extend through bracket 96 in different levels but they each have a tab 150 (FIG. 4) in the same location which rests against arm 61 of bar 59. Arm 61 normally holds contacts 46 in an open position also, and an insulating end 151 on the movable blade 46a rests against a bentdown portion of arm 61. The latter thereby controls the operation of contacts 46 and also of the three contact points on wipers 47, 48 and 49.

The program functions are controlled by three code bars 152, 153 and 154, FIGS. 3, 4, 9 and 10, the position of which at every hour or half-hour point is determining one of the following functions which can take place: all automatic actions blocked, turning the switch 40 ON and determining the channel position on which disc 50 will stop, turning the switch 40 OFF or turning the switch 40 OFF and locking the mechanism for further automatic action.

Code bars 152, 153 and 154 are formed from sheet metal and are similar in their shape. They are loosely pivoted between the brackets 68 and 96 and in a horizontal assembly, as described here, gravity is sufficient for their proper operation. Both ends of the bars are adapted to be sensed and their position determines the functions which they perform. The ends 155, 156 and 157 on the right side control the operation of rod 57 and bar 59 while the ends 158, 159 and 160 on the left side serve as blocking means to sensing plates 62, 63 and 64.

Means are provided to control the positioning of code bars 152, 153 and 154. A mechanism to accomplish this includes the selector lever 37, a time disc 161 and a torsion spring 162 (FIG. 9). In a 12-hour, half an hour selection programmer, 24 sets of the above-mentioned parts are used. Discs 161 are driven by the 12-hour shaft 92 and have specially shaped notches 163 in their periphery. Each notch 163 on each consecutive disc 161 is spaced 15° apart and consequently the notches form a one turn helix on the entire shaft assembly. Various manufacturing and assembly methods are possible here, among which the drawings show the shaft 92 with a fluted center part or as a 24 teeth pinion rod. Each disc 161 has an internal tooth 164 serving as a key on shaft 92 and making possible an assembly of discs 161, 15° apart by placing the key 164 of each disc 161 between the consecutive teeth on shaft 92. Spacer rings 165 are used to maintain the spacing of discs 161 on shaft 92 the same as is the spacing of slots 38 on base 67.

One end of each of levers 37 extends through the base or panel 67 and is guided by the slots 38 while the other end has a stepped bentover portion 166 to hold it on the periphery of a disc 161. The torsion springs 162 have their coils resting around a rod 167 which serves also the purpose of keeping brackets 68 and 96 in their proper relationship. One end of each of the torsion springs 162 bears against a tube 168, which can also serve as a conduit for the wires of motor 44, while the other end of each spring is looped and is anchored in a slot 169 of a lever 37. Springs 166 can be formed in pairs with their stationary ends formed in a looped fashion as shown at 170 (FIG. 3) whereby their stability can be improved and handling thereof is made easier.

The operating ends of springs 162 exert their force in a counter-clockwise direction and the looped ends in a clockwise direction. This keeps a bentover lug 171 on a lever 37 against one of the grooves 172 formed in the central curved section of base 67. Therefore, the upward and forward movements of the levers 37 are restricted by grooves 172 while discs 161 restrict the upward motion of the bentover portions 166. When the levers 37 are set by hand, ends 166 which overlie discs 161 will act as fulcrums for them and when an end 166 snaps into a notch 163, the lug 171 will act as a fulcrum for a lever 37. It can thus be seen that the arrangement permits the movement of any lever 37 manually from its upper home position to any of its seven positions and as the shaft 92 rotates, the levers can snap into the notches 163 one after another, the time between such actions being approximately 30 minutes.

Figure 10:
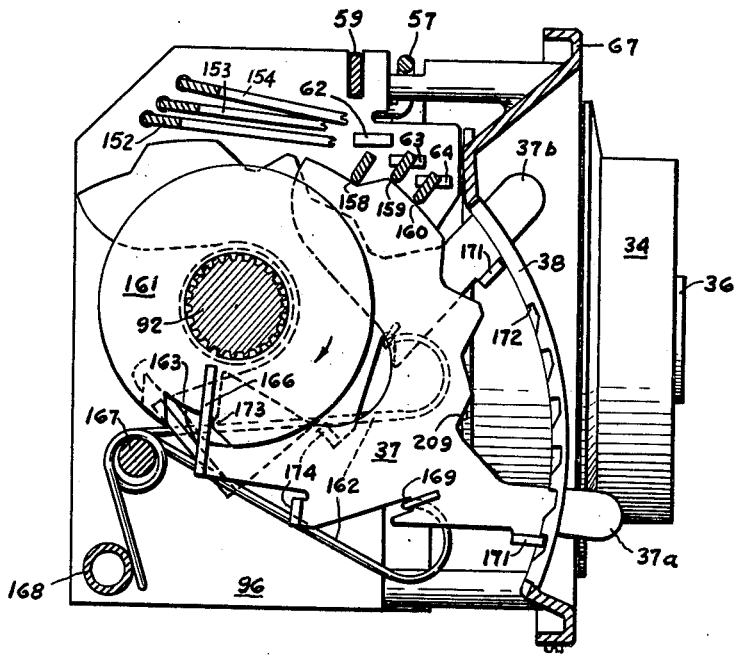
FIG. 10 is a sectional view of FIG. 3, taken along the line 10—10.

FIG. 9 shows a lever identified as 37a just before its snap-in action and FIG. 10 shows the same lever some 30 minutes after such action. As the disc 161 rotates further, a shoulder 173 of it will catch the bentover portion 166 and start pulling it to the left until the lug 171 is out of notch 172. Next the spring 162 will swing lever 37 upwardly until another lug 174 of lever 37 will contact the periphery of disc 161. This happens when lug 171 is in line with the uppermost groove 172. Now lug 174 becomes a fulcrum to lever 37 and since the spring force is still applied at 169, the bentover portion 166 of lever 37 will be lifted out of notch 163.

FIG. 10 shows a lever identified as 37b in its home position, in which there cannot be a snap-in action because lug 174 and the portion 166 alternately prevent it while the notch 163 is passing underneath them. Lever 37 has a floating nature because during its operation it has three different fulcrums: portion 166 during manual setting, lug 171 during snap into notch 163 and during return stroke, lug 174 will act as a fulcrum.

The snap-in and pull-out time of levers 37 from notches 163 will vary slightly and is dependent on the position of lever 37. A study of the geometry reveals that if the radius of the curvature for the curved section of the base 67 equals the distance from lug 171 to the contact point of end 166 and the center of the radius lies on the periphery of disc 161, the snap-in time is the same regardless of the position of lever 37. On the other hand, the snap-out time becomes the same if the center is moved to the bottom of notch 163. A selected location about half way of the above-mentioned extremes seems to give the best results, making the time difference about equal in both cases. As will become apparent later, this time difference does not affect the accuracy of the programmer.

The program information of a lever 37 is transferred to code bars 152, 153 and 154 by a sector of lever 37 which contains high sections 175 and 176 and low sections 177, 178 and 179. It can be seen that when the code bars are resting on the high or low sections of a lever 37 and considering the two positions for each of the three code bars, there can be 8 different combinations which is the number of possible combinations in a system know as a binary system. If the low position of a code bar (bar 158 in FIG. 10) is expressed as a binary 0 and the high position (bars 159 and 160) as a binary 1, a preferred arrangment of combinations can be written as follows:

| 1 | 000 | OFF |
| 2 | 100 | |
| 3 | 010 | |
| 4 | 101 | ON |
| 5 | 110 | |
| 6 | 111 | |
| 7 | 011 | |
| 8 | 001 | OFF |

This schedule in the same order as above can, for example, be given to code bar ends 152, 153 and 154 by any lever 37 if the latter has snapped into the notch 163 of disc 161 and moved down step by step. FIG. 10 shows such a lever 37a set to position 7 (channel 13). The positional pattern of the bar ends 158, 159 and 160 will be transferred to sensing plates 62, 63 and 64 and to their contacts 47, 48 and 49 if they are allowed to move to the right. A binary 1 will act then as a blocking to a sensing plate leaving its contact point to the left position and a binary 0 does not cause a blocking action to its sensing plate and its contact point can move to the right.

Figure 8:
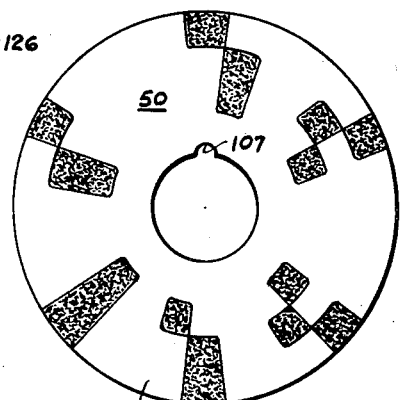
FIG. 8 is a detail view showing a position seeking disc.

The detail of disc 50, FIG. 8, shows patterns 2–7 in a counter-clockwise order which is the rotating direction of disc 50 as viewed from the rear. The patterns 52 are insulating areas and consequently a circuit will be broken if an insulating pattern on disc 50 matches the pattern determined by an active lever 37.

The selected program information which is one of the 8 positions of lever 37 is translated to a coded form or encoded to one of the two positions of each code bar and to their corresponding contact positions on disc 50. During position seeking movement the opposite action to encoding which is know as decoding takes place. As a result each position of lever 37, except the first and last which are reserved for OFF function, refers to a certain position on disc 50.

The sensing action is initiated by a cam mechanism which is shown in FIG. 3 just before a cam drop and FIG. 18 shows it after the first cam drop. The mechanism includes the 30-minute cam 54 together with another cam 180 and a pin 181 which can be all molded from a plastic material such as nylon and secured to their driving shaft 85. Cam 54 has a follower 55 while cam 180 has another follower 182, both independently pivoting at 56. Follower 55 has a bentover portion 183 in contact with shift-bar 59 holding the latter from moving out from its guiding groove 184 (FIG. 19). Another bentover end 185 of lever 55 works between an arm 186 of lever 182, an arm 187 of a sensing plate 188 and an arm 189 of a locklever 190, the latter pivoting at 191.

Sensing plate 188 acts as an extension to rod 57, its bifurcated ends guided in notches 192 and 193 (FIGS. 12, 18 and 19) in bracket 68. The other end of the sensing plate is slotted at 194 and guided in a groove 195 in shaft 85, a hole 196 serving as an assembly hole therefor. The tension spring 58 which is sufficient to operate the switch 40 to OFF position is applied to the sensing plate 188, a very light tension spring 197 is applied to lever 190 and a heavier tension spring 198, sufficient to work against the spring 58 or against contact springs 47, 48, 49 and 46, is applied between an arm 199 and a fixed post 200. Arm 199 of lever 182 has a bentdown ear 201 which rests on the cam 180 and a bentup lug 202 serving as a locking corner against a step 203 of lever 190.

After the cam drop of follower 55 shift-bar 59 biased by spring leaf 46a is allowed to move to the right and rod 57 under influence of spring 58 to the left. One of them or both will be blocked however, as described later. If both stay blocked, follower 55 will move only a short distance leaving the lug 202 and step 203 in engagement. If one of them is not blocked, lug 185 will cause a disengagement to lever arm 182 and the latter can make its cam drop a few seconds after the drop of follower 55. This will return the parts to the initial position shown in FIG. 3. As a result the cam mechanism is giving a mechanical "square" sensing pulse every 30 minutes with a duration of a few seconds if one of the sensing bars 57 or 59 is not blocked.

The locklever 190 is not a necessity to the operation of the mechanism but it prevents the dropping of lever 182 when there is no automatic action coming. This will reduce the wear and load of motor 44 as well as easing the manual time setting.

Means are provided for a selective blocking for the bar 59 and sensing plate 188 FIGS. 12–17. A bentover portion 204 of the bar 59 can be blocked by a gravity operated blocking lever 205, freely pivoting at a pin 206. Lever 205 rests on the bar ends 155 and 156 and when one of them is lifted up, a portion 207 of lever 205 will be moved away from its blocking position in front of the lug 204. Sensing plate 188 can be blocked by bar ends 155 or 156 when they are in their upper position or by end 157 when it is in its lower position. As can be seen in FIG. 12, an alternating positive blocking action is obtained by ends 155 or 156 and lever 205: if end 155 or 156 or both are in their upper position, they are blocking the plate 188 and bar 59 is free to move, if both are down, plate 188 is free and bar 59 is blocked.

A reference is made now to the listing of binary combinations as described hereinbefore in which the first is used for a home position, the last for an OFF position and combinations 2–7 are used for channel selections together with the ON function. The listing reveals that in the first and second vertical row only the first and last combination has 00 while combinations 2–7 have at least one 1. Consequently, combinations 1 and 8 are not blocking sensing plate 188 and let the lever 205 block the bar 59. Combinations 2–7 are acting the opposite way: they are blocking plate 188 and freeing the bar 59. In other words the ON-OFF selection is controlled by the position of bar ends 155 and 156.

The OFF action, initiated by a selector lever 37 in its OFF position with the combination 001, is shown in FIGS. 14 and 15. The bar end 157 has its lower corner cut off to clear plate 188 while the ends 155 and 156 are not lifted to the blocking position.

The bar end 157 is used to provide a blocking action to the sensing plate 188 and prevent "OFF" movement of rod 57 in three special conditions. First, if there is no automatic action coming but some selections are made in the keyboard. In this case the bar 154 is resting on the same level as bars 152 and 153 leaving a portion 208 of end 157 in the blocking position for the plate 188. A second condition exists when OFF has to be blocked. This is the same as just described but some of the low sections 177, 178 or 179 of selected but nonactive levers 37 happen to line up making it possible for the bar 154 to drop a further step. The blocking to plate 188 in this case is still done by portion 208 because it covers two steps of bar 154. In the third case the end 157 will drop to its fourth or its lowest position which can take place only when all the keys 37 are in their home position. This further step is made possible by another step 209 in selector levers 37. This last step of bar 154 will not be completed right after the last lever 37 has moved to its home position, however, because a longer protrusion 210 of bar end 157 will stop it and it remains resting on plate 188, FIG. 17. The drop of bar 154 can be completed now only when the plate 188 can move to the right. This can take place in two ways: by the pin 181 on cam 180 acting on a bentover portion 211 of plate 188 or by the cam surface 131 acting on rod end 116. As this happens, the bar 154 can drop further and lock the OFF-rod 57 from further interference. If this action is performed by pin 181, a single OFF pulse will be given first because plate 188 is not blocked yet and this action will take place half an hour after the last selection time. If the button 36 is pushed, however, the locking can take place sooner and the mechanism is locked from further automatic action permitting a normal automatic operation without the use of any additional controls.

A timing cycle diagram, FIG. 21, shows a "square sensing pulse" 212 taking place at every 30-min. point unless it is prevented by lever 190. The drop as well as return of levers 37 is also "square" in their nature but the timing of them can greatly vary. It is only necessary that during the instant the sensing pulse 212 is given only one of the levers 37 is in its active position, which means that its snap-in time can be anywhere within 30-min. before the sensing time point and its return time anywhere within 30 min. after the sensing time point. The return, however, should not take place before the locking movement 213 in FIG. 21 has been completed by pin 181, otherwise the mechanism will be locked before making the final OFF pulse.

As a summary the operation of the mechanism will be described briefly once more. If a program selection is made, the movement of the first lever 37 out of its home position to a selected channel position simultaneously prepares the mechanism for automatic action. This will be done by cam surface 209, FIGS. 9 and 10, which lifts up the code-bar 154 from its locking position. Taking now a simple program: namely 6:00 o'clock—channel 4, 6:30 o'clock—channel 9 and 7:00 o'clock—OFF, as shown on FIG. 2 the functions which take place are as follows. After 5:30 o'clock and before 6:00 o'clock, the lever 37 in the 6:00 o'clock slot 38 makes its snap into the notch 163 of its corresponding disc 161. This sets the bar 153 up and bars 152 and 154 stay down. On the selector end a condition shown in FIG. 12 appears where lever 205 is moved away from the blocking position of ON-bar 59 and the end 156 is moved to the position to block the movement of OFF rod 57. After the timing-cam 54 drop, FIG. 18, shift-bar 59 can move to the right which permits the contacts 46 to close and sensing plates 62 and 64 move to the right while sensing plate 63 will be stopped by the bar end 159.

Now the circuit of the tuner motor 45 is closed and it starts turning the tuner 42 together with its knob 34 and disc 50. This lasts until the pattern 010 of contact wipers 47, 48 and 49 finds its corresponding insulating pattern on disc 50. In FIG. 20 this is the next insulating pattern to the right. If the tuner together with disc 50 happen to be already in that position, the circuit of motor 45 will not be made and it does not start. The end 60 of bar 59 is also turning the switch 40 ON, but if it happened to be ON already, nothing further will happen also.

The drop of follower lever 55 also moves the locklever 190 to its unlatched position, FIG. 18, making the return stroke of lever 182 possible a few seconds later. This returns the lever 55 to its original position, opening the contacts 46 and freeing the bars 152, 153 and 154. The tuner is now free for manual adjustment if the operator wishes to change the program which was just automatically tuned in. In other words the automatic action during which the manual adjustment of tuner is not possible will last only a few seconds and this is the time difference between the drops of followers 55 and 182.

After the 6:00 o'clock sensing and before 6:30 the 6:00 lever can make its return to the home position and the 6:30 lever is making its snap into the notch 163. In other words, before 6:30, bars 152, 153 and 154 will be set to a new binary combination 110 which corresponds to channel 9. At 6:30, a similar action takes place as described above. At 7:00 the OFF selection has to initiate the OFF mechanism. The combination 001 is shown in FIG. 14 where the bar 59 stays blocked and sensing plate 188 together with rod 57 can move freely to the left pushing the switch 40 to the OFF position.

It the OFF selection was not made at 7:00 and no further selections were made, the OFF function still will take place but according to FIG. 16 and in this case, this will happen at 7:30.

As can be seen from the foregoing, the six available channel or station positions are not tied to any particular stations in any other way than the order on the panel scale and on disc 50, FIGS. 2 and 8. In the illustration channels 2, 4, 7, 9, 11 and 13 are used which means the patterns on disc 50 are located to the same channel positions and in the same order. A simple change can be made using just new channel identifications on panel or placing an adhesive sticker with new identifications over the existing scale and replacing disc 50 with the one which has its insulating patterns 52 arranged in the order corresponding to the new panel scale. As described herein before the channel knob 34 together with disc 50 can be removed easily from the front by loosening its retainer 108 (FIG. 5) in order to make the change possible.

A modified version of the sensing and homing mechanism is shown in FIGS. 22–25. Functionally most of the parts in said modification are the same as hereinbefore described and have the same reference numbers to designate the corresponding parts as previously. In the mechanism as described hereinbefore, a mechanical movement was used to set up the position seeking contacts 47, 48 and 49. With three contacts there were six possible positions giving six combinations to match the insulating patterns 52 on disc 50. In the electrical selection version now to be described, the selection is done by means of a series of single-pole, double-throw switches which are electrically connected to contact points on disc 50. Though the arrangement employs more electrical contacts and some extra wiring, it makes possible the use of a flexible electrical connection to the disc 50 which controls the tuner.

By moving the channel sensing mechanism and switch 40 to the right, the left section as shown in FIG. 3 will be eliminated and the entire control mechanism can be mounted to the plate 68 (FIG. 22). The mechanism is controlled again by the clock or timing motor 44 which drives the cam-pair 54 and 180 together with the pin 181. The cam follower pair 55 and 182 are independently pivoted at 56; the follower 55 being used again to start the sensing action of OFF bar 57 or ON bar 59 and the drop of follower 182 initiates the return stroke to them. OFF bar 57 has one end working loosely in a guide slot 214 and its other end is pivotally secured at 215 to a reversing lever 216, the pivoting point 217 of the latter being secured to plate 68. Bar 59 is guided in a slot 218 and a bentover end 60 of it is guided in a slot 117. A bentover end 219 of lever 216 and lug 60 operate the ON-OFF switch 40 similarly to FIG. 6.

The manual control is also similar to the previous version. This is done by a pushbutton 36 which operates a bellcrank 220, pivoted at 221 and used to give a shifting action to an operating arm 222. The latter can be compared to a combination of previous parts 119 and 125 operating the push-plate 120 and switch-lever 121. Arm 222 is guided by a guide-slot 128 in plate 68 and by an arm 223 of bellcrank 220 which extends through a slot in part 222. The co-action of a pin 224 on bar 57 and a cam-face 225 on arm 222 moves the bar to the right every time the button 36 is pushed and this action locks the mechanism from further automatic operation if all the selector levers 37 are home.

Bars 57 and 59 have bentover ears 226 and 227, respectively, resting against an arm 228 of lever 55. They also have protrusions 229 and 230, respectively, which can stop the movement of them to the left if the end of lever 205 is in front of one of them. As can be seen in FIG. 23, lever 205 will stop the bar 59 if both code-bar ends 155 and 156 are in their down position. If one of them is lifted by a selector lever, however, lever 205 will be lifted also and its end will free bar 59 and block the bar 57. This action and purpose is again comparable to those in the previous embodiment.

The OFF bar 57 is similarly dependent upon the four positions of bar 157 but this is shown in opposite arrangement to FIG. 17. A lug 231, bent from the stock of bar 154 can block the bar 59 in position shown in FIG. 22 as well as the next position down as shown in dotted lines. A position up can give the OFF pulse if lever 205 is not preventing it. The OFF pulse is also given if all the levers 37 have moved to their home position. In that case lug 231 first drops to the longer portion 232 of bar 57 and after the OFF pulse is given the movement of the bar 57 to the right lets the bar 154 to complete its drop to its lowest position where it will block the further automatic interference.

Means are provided to electrically set up a contact pattern to initiate position seeking on disc 50. Three selecting switches 234, 235 and 236, each containing a flexible leaf 237 having a spring force to the left, a rigid leaf 238 and another flexible leaf 239 with a stop plate 240, perform a selecting action which is controlled by bar ends 155, 156 and 157. Normally the insulated ends 241 of center leafs 237 are held in their right position in contact with leafs 239 by means of an arm 242, bent over from the stock of bar 59. If the latter can make its drop, a leaf 237 can move only a short clearance distance if its corresponding bar end 155, 156 or 157 is in the down position and contact leaves 237 and 239 stay closed. If a bar is in its upward position, leaf 237 is free to move and it will contact the leaf 238. Contact-pair 46 is also controlled by arm 242 and it always closes when bar 59 is allowed to drop.

The contact assembly contains a part of the circuitry and can be molded to an insulated block 243 which is screwed to plate 68 by means of two screws 244. The three center leaves 237 and the moving leaf of contact pair 46 are common and can be stamped from same stock. Leaves 238 and 239 and the lower leaf of contact pair 46 have terminals for connecting them to the circuitry. Disc 50 is in contact with six position seeking wipers and a wiper 53, all of them insulated from each other and supported by an insulating block 245. There are three identical leaf pairs 246 and 247, the wiper contact point of them with disc 50 being a distance apart comparable to the movement of leaves 47, 48 and 49 in previous embodiment.

Leaves 246 are connected to leaves 238 and leaves 247 are connected to leaves 239 giving a three pair parallel connection. As the contact pair 46 is closed the power is led to the center leaves 237 and depending on their position one of the contact points on leaves 246 or 247 in each contact pair is made active. This sets up a position seeking pattern as was previously explained by the moving contacts. The circuit to motor 45 is now closed through disc 50 and wiper 53 which stays in continuous contact with disc 50. Unless the pattern of the position seeking contacts was same as an insulating pattern 52 underneath the active contact points, the motor 45 starts rotating disc 50 and the tuner 42 until it finds the matching insulating pattern 52 on disc 50.

Reference is made now to the position in FIG. 22, assuming that a channel selection was made by a lever 37 and suppose the time has arrived to activate that selection. Further if at least one of the bars 155 and 156 were lifted, the operation selector or blocking lever 205 was moved up causing an unlatching to bar 59 and locking to bar 57. As the cam-follower 55 makes its drop now, contact pair 46 closes and a selection of contact points 246 and 247 in each of the three pairs will be made and the position seeking can take place. As a secondary function, the lug 60 will give an ON pulse to the blade 118.

Follower 55 will also move lock-lever 190 from the holding position of return lever 182. The spring 58 is used here to operate bar 57 by being hooked to the ear 226 and also to give lever 190 the required counter-clockwise turning moment. A few seconds after the drop of follower 55 the return follower 182 on cam 180 and powered by spring 198 can make its drop and move bar 59 back to the right by means of its ear 227.

The electrical embodiment as just described makes it possible to have the tuner and its control contacts remotely located giving an extra design flexibility and making it also possible to locate the program unit separately from the television or radio unit if relay magnets are used to control the ON-OFF switch 40.

Basically speaking, both the mechanical and the electrical positioning principles of my invention are the same. The code patterns, insulating areas 52 (FIG. 8), on the commutator are set up in a combination of two positions for an electrical code matching using a number of parallel circuits. A mismatch between the code patterns always can pass the electrical power to the driving means through at least one of said parallel circuitry. A code match is used to break all the parallel circuits and stop the motor. In the mechanical version there is a single moving wiper contact on the commutator for each parallel circuit and one of its two positions is selected mechanically which in the present embodiment is controlled by the code bars. In the electrical version, there is a fixed wiper contact pair on the commutator for each parallel circuit and the code bars serve the function of selecting one or the other wiper point in each of said parallel circuits. It should be noted here that this two-position wiper system serves as a direct decoding control or coded shaft positioning control where decoding is done directly on the commutator without the use of a complex relay network. This system further has the flexibility of arranging the code patterns on the commutator in various different ways; nonequidistant apart, radially on a flat commutator disc, on the surface of the drum, achieving the same two-position selection with cam operated micro-switches etc., and all this can be arranged also in a non-rotating mode.

As a conclusion the system can be called a direct two-position code matching control, where the word "direct" means it is done directly on a single commutator or moving element without the use of a relay network.

The two embodiments and especially the second variation offer a considerable design flexibility to suit them to various appearance designs. For instance, the program scale may be positioned vertically with keys 37 moving horizontally. In that case, however, the gravity cannot be used to operate the sensing bars 152, 153 and 154 as well as lever 205. Instead light springs should be applied to them to give them the desired movement necessary for positioning them.

Various other modifications may be resorted to within the range of engineering or skill in the art. It is the intention, therefore, to be limited only by the scope of the following claims.

What I claim is:

1. In programmed tuner having a drive shaft, electrical driving means for said tuner shaft, electrical control circuitry for said driving means, a code generating mechanism for said control circuitry, timing means for periodically activating said control circuitry, a program selector scale having indicia for the stations and the time of day points for the programs to be controlled, a series of manually operable means positionable on said scale for preselecting the stations and time of day points for operation of the tuner, said preselecting means comprising a plurality of spring biased levers, one end of each said lever bearing on a time disc provided with a notch, the time of registry of said notch and lever referring to the time index on said selector scale, said lever having segments capable of setting up $n$ number of code bars each in one or the other of their two positions if said registry occurs between said time disc and lever end, said lever having a maximum number of $2^n$ preselectable positions on said time index of said selector scale, each said position referring to a different code combination and each said code combination serving as an input to a coded positioning control.

2. The combination set forth in claim 1 wherein each preselectable lever extends through a slot in a base member carrying said program selector scale and has three fulcrum points which come into operative functioning in a predetermined manner, a first fulcrum resting against said time disc and becoming active during said manual preselecting, a second fulcrum resting against said base member and becoming active during registry of said first fulcrum and notch in said time disc, a third fulcrum point lying between said first and second fulcrums, spring biasing means applied between second and third fulcrums in a manner to keep said first fulcrum bearing against said time disc and said second fulcrum bearing against said base member, said base member having a maximum of $2^n$ engageable points to said second fulcrum against said base member, said spring biasing means causing a snap-in of said first fulcrum into said notch in said time disc if said registry occurs between said first fulcrum and notch, said snap-in raising said $n$ number of code bars selectively and differently, each position of said preselecting lever setting a different code combination to said $n$ number of code bars, the further movement of said time disc causing a disengagement of said second fulcrum and base member, said disengagement causing said preselectable lever to move to its home position, said third fulcrum becoming an active fulcrum point against said time disc after said disengagement with a result of lifting said first fulcrum out from said notch in said time disc and permitting a free rotation to said time disc thereby.

3. In a programmed tuner drive according to claim 1, wherein there are three code bars, each positionable to one of their two positions when one of said preselecting means comes to registry with said timing means, one of said two positions not moved by a segment of said preselecting means carrying a designation "0," the other of said positions of one of said code bars which was moved by a segment of said preselecting means carrying a designation "1," an arrangement of segments on said preselecting means causing a code combination follow-up:

000
100
010
101
110
111
011
001

4. In a programmer for an electrical device according to claim 1, wherein the series of manually operable means for preselecting the stations comprises $m$ number of preselectable keys and an ON-OFF bistable electrical switch, said switch having means for automatic and manual control, a timing control comprising of a slow and a fast shaft rotating in a controlled relationship within a timing cycle, said slow shaft having fixed thereon for rotation therewith a maximum number of $m$ timing discs, each said consecutive timing disc having a notch spaced $360°/m$ apart, the registry of each said notch with its key referring to a time of day point on a time scale, said fast time shaft completing $m$ timing cycles within one cycle of said slow shaft, said fast time shaft releasing a powered ON and OFF member once within its timing cycle, the release on said ON member being capable of turning said switch to ON position, said OFF member being capable of turning said switch to OFF position, each said key in registry with said notch having means to preselect the action of either said ON or OFF member to operate said switch.

References Cited

UNITED STATES PATENTS

| | | |
|---|---|---|
| 2,676,289 | 4/1954 | Wulfsberg et al. |
| 2,823,345 | 2/1958 | Rayland et al. |
| 2,989,680 | 6/1961 | Weiser et al. |
| 3,017,557 | 1/1962 | Amato. |
| 3,027,506 | 3/1962 | Stenhammer et al. ___ 318—486 |

THOMAS E. LYNCH, Primary Examiner

U.S. Cl. X.R.

318—467; 340—309.4